US009664333B1

(12) United States Patent
Hudson

(10) Patent No.: US 9,664,333 B1
(45) Date of Patent: May 30, 2017

(54) RETAINING DEVICE

(71) Applicant: Thomas Floyd Hudson, Seattle, WA (US)

(72) Inventor: Thomas Floyd Hudson, Seattle, WA (US)

( * ) Notice: Subject to any disclaimer, the term of this patent is extended or adjusted under 35 U.S.C. 154(b) by 0 days.

(21) Appl. No.: 14/677,542

(22) Filed: Apr. 2, 2015

Related U.S. Application Data

(60) Provisional application No. 61/974,998, filed on Apr. 3, 2014.

(51) Int. Cl.
  *A47H 1/10* (2006.01)
  *F16M 13/02* (2006.01)
(52) U.S. Cl.
  CPC .................................. *F16M 13/02* (2013.01)
(58) Field of Classification Search
  CPC ........ F16B 45/00; F16B 11/00; F16B 45/025; F16M 13/02
  See application file for complete search history.

(56) References Cited

U.S. PATENT DOCUMENTS

| 1,524,761 | A | * | 2/1925 | Timbs | E21B 19/04 24/599.5 |
| 4,751,892 | A | * | 6/1988 | Sechel | B63B 21/00 114/221 R |
| 4,767,144 | A | * | 8/1988 | Hornberg | B66C 1/38 24/599.7 |
| 5,538,303 | A | * | 7/1996 | Dunham | B63B 21/54 24/599.1 |
| 5,704,668 | A | * | 1/1998 | Ferrato | F16B 45/00 294/82.33 |
| 7,976,085 | B1 | * | 7/2011 | Neaton | B66C 1/36 294/103.1 |
| 8,327,788 | B1 | * | 12/2012 | Cardarelli | B63B 21/54 114/221 R |

* cited by examiner

*Primary Examiner* — Amy Sterling

(57) ABSTRACT

A ring serves as a retaining device for objects. A gate on the ring opens to receive objects that move on one specified axis of direction for entry and retainment. A gate on the ring opens to dispense a retained object that is moving on a separate specified axis from that on which it entered. Depending on embodiment, entry and exit are provided through a single dual axis gate or by two respective gates. Biasing mechanisms urge the gate(s) closed whereupon moving force of contact from an object to enter or exit overpowers the respective bias. Absent overriding directional force, the ring remains closed, retaining an object within. A provision to mount the ring to an anchor which exceeds by inertia the gate biases is included.

5 Claims, 3 Drawing Sheets

RETAINING DEVICE

RELATED APPLICATION

This application is based upon pending Provisional application No. 61/974,998 filed Apr. 3, 2014, the subject matter of which is incorporated herein by reference.

BACKGROUND OF THE INVENTION

Field of the Invention

The present invention relates to a retaining device and more particularly pertains to receiving and dispensing objects 14 through moving contact between the objects and the retaining device. The receiving, the dispensing, and the moving contact are done in a safe, convenient, and economical manner.

Description of the Prior Art

The use of retaining devices of known designs and configurations is known in the prior art. More specifically, retaining devices of known designs and configurations previously devised and utilized for the purpose of retaining and dispensing objects are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a retaining device that allows receiving an indefinite number of kinds of objects through force of moving contact between an object and the retaining device on one axis of direction, and dispensing the object through force of moving contact between the object and the device on another axis of direction. The receiving, the dispensing, and the force of moving contact on two distinct axes are done in a safe, convenient, and economical manner.

In this respect, the retaining device according to the present invention substantially departs from the conventional concepts and designs of the prior art, and in doing so provides an apparatus primarily developed for the purpose of receiving an indefinite number of kinds of objects through force of moving contact between an object and the retaining device on one axis of direction, and dispensing the object through force of moving contact between the object and the device on another axis of direction. The receiving, the dispensing, and the force of moving contact on two distinct axes are done in a safe, convenient, and economical manner.

Therefore, it can be appreciated that there exists a continuing need for a new and improved retaining device which can be used for receiving an indefinite number of kinds of objects through force of moving contact between an object and the retaining device on one axis of direction, and dispensing the object through force of moving contact between the object and the device on another axis of direction. The receiving, the dispensing, and the force of moving contact on two distinct axes are done in a safe, convenient, and economical manner. In this regard, the present invention substantially fulfills this need.

SUMMARY OF THE INVENTION

In view of the foregoing disadvantages inherent in the known types of retaining devices of known designs and configurations now present in the prior art, the present invention provides an improved retaining device. As such, the general purpose of the present invention, which will be described subsequently in greater detail, is to provide a new and improved retaining device and method which has all the advantages of the prior art and none of the disadvantages.

To attain this, the present invention comprises a ring, or constructions comprising the function of a ring that may serve as a retaining device; having a gate that opens to be capable of receiving and retaining an indefinite number of kinds of objects, objects that move on one specified axis of direction for entry into the ring; additionally, a gate on the ring that opens to dispense a retained object, an object that is moving on a separate defined axis from that on which it entered. The two axes, one for entry and one for exit, may be achieved by a single gate that moves on two axes, or by separate gates for each axis of movement. Additionally, a biasing mechanism urges each gate into a position so that the ring remains effectively closed, whereupon a specified direction of force by contact from an object to enter into the ring overpowers the bias, opening the gate for entry, after which, the bias returns the gate to a closed position; and a second specified direction of force by contact from an object to dispense it from the ring also overpowers the respective bias, opening the gate for exit.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved retaining device which has all of the advantages of the prior art retaining devices of known designs and configurations and none of the disadvantages.

It is another object of the present invention to provide a new and improved retaining device which may be easily and efficiently manufactured and marketed.

It is a further object of the present invention to provide a new and improved retaining device which is of durable and reliable constructions.

An even further object of the present invention is to provide a new and improved retaining device which is susceptible of a low cost of manufacture with regard to both materials and labor, and which accordingly is then susceptible of low prices of sale or distribution to the end user, thereby making such retaining device economically available to its markets.

Lastly, still another object of the present invention is to provide a retaining device for receiving an indefinite number of kinds of objects through force of moving contact between the objects and the retaining device on one axis of direction, and dispensing the object through force of moving contact between the object and the device on another axis of direction. The receiving, the dispensing, and the force of moving contact on two distinct axes are done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated one embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
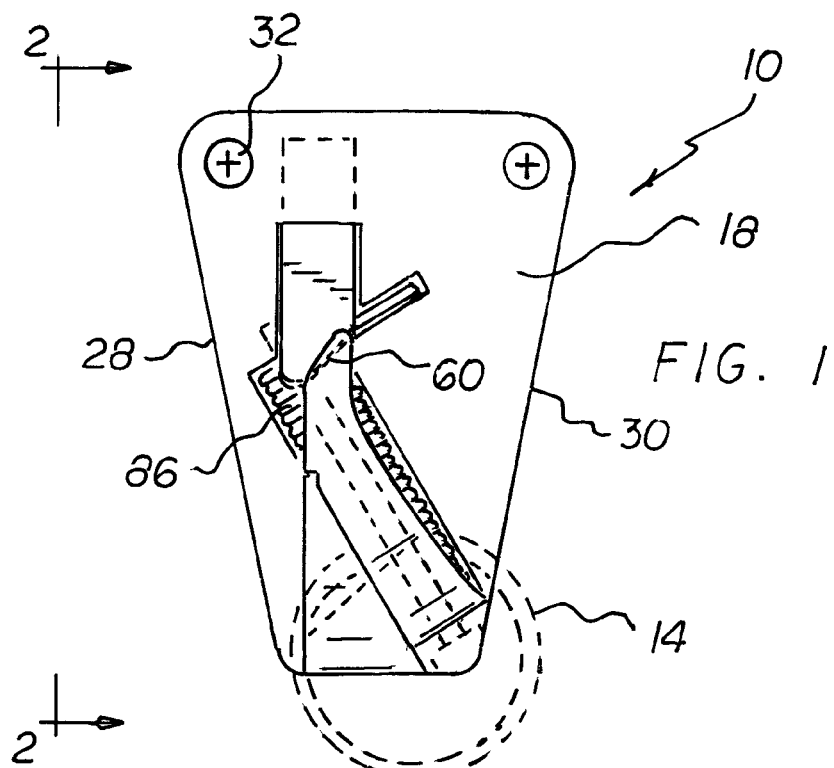
FIG. 1 is a front elevational view of a retaining device constructed in accordance with the principles of the present invention.
Figure 2:
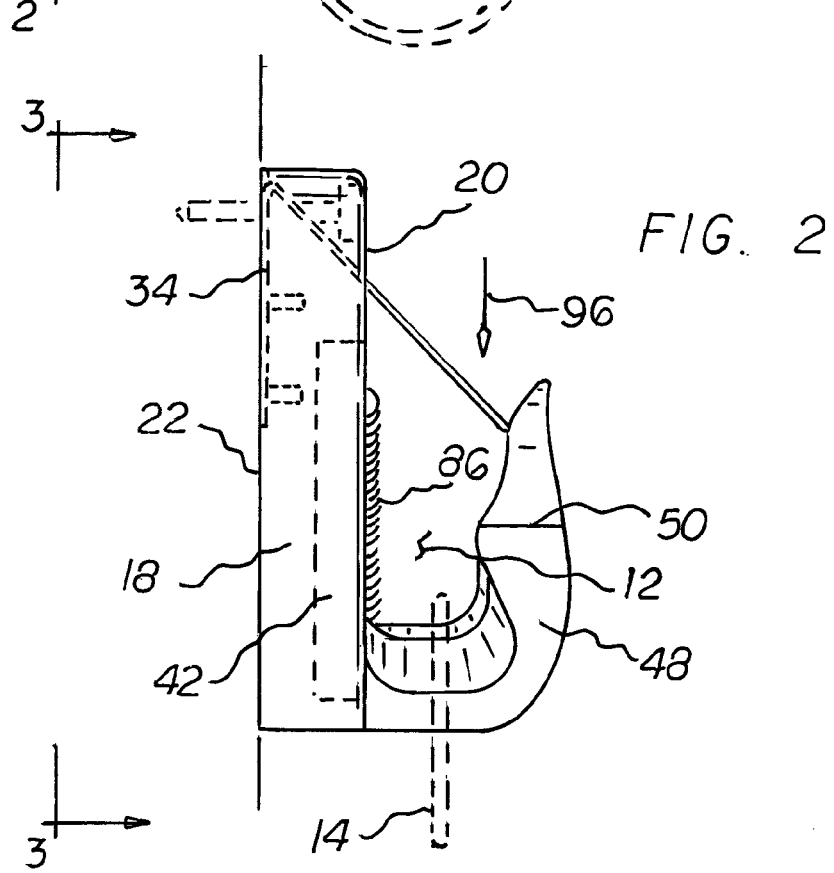
FIG. 2 is a side elevational view taken along line 2-2 of FIG. 1.
Figure 3:
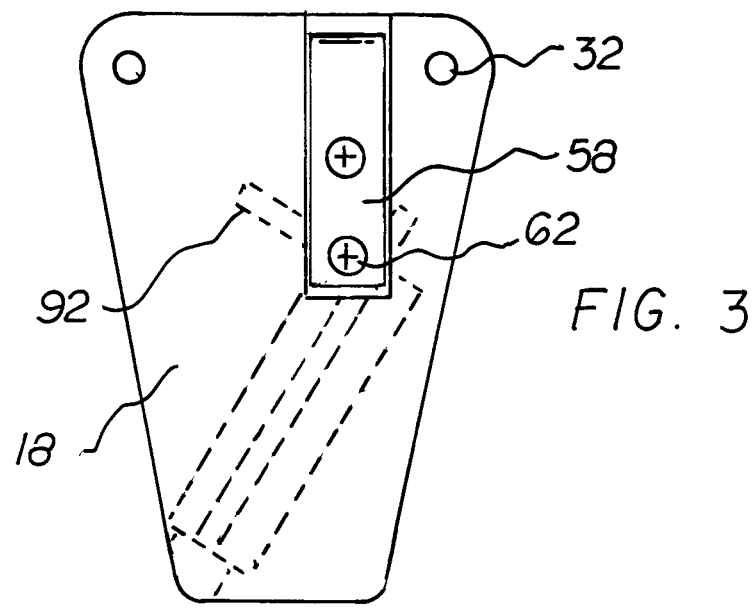
FIG. 3 is a side elevational view taken along line 3-3 of FIG. 2.
Figure 4:
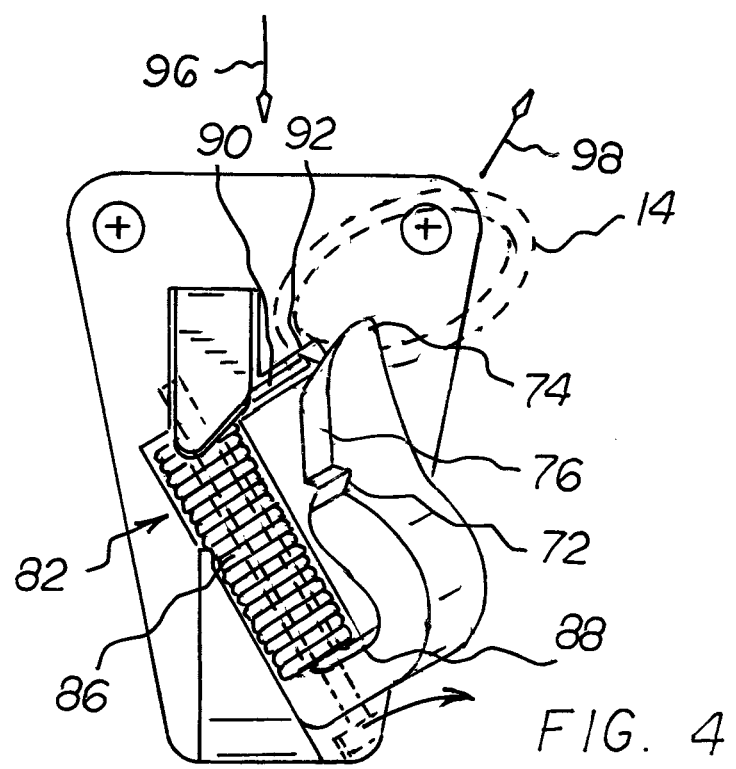
FIG. 4 is a front elevational view similar to FIG. 1 but with the gate pivoted to an open orientation.
Figure 5:
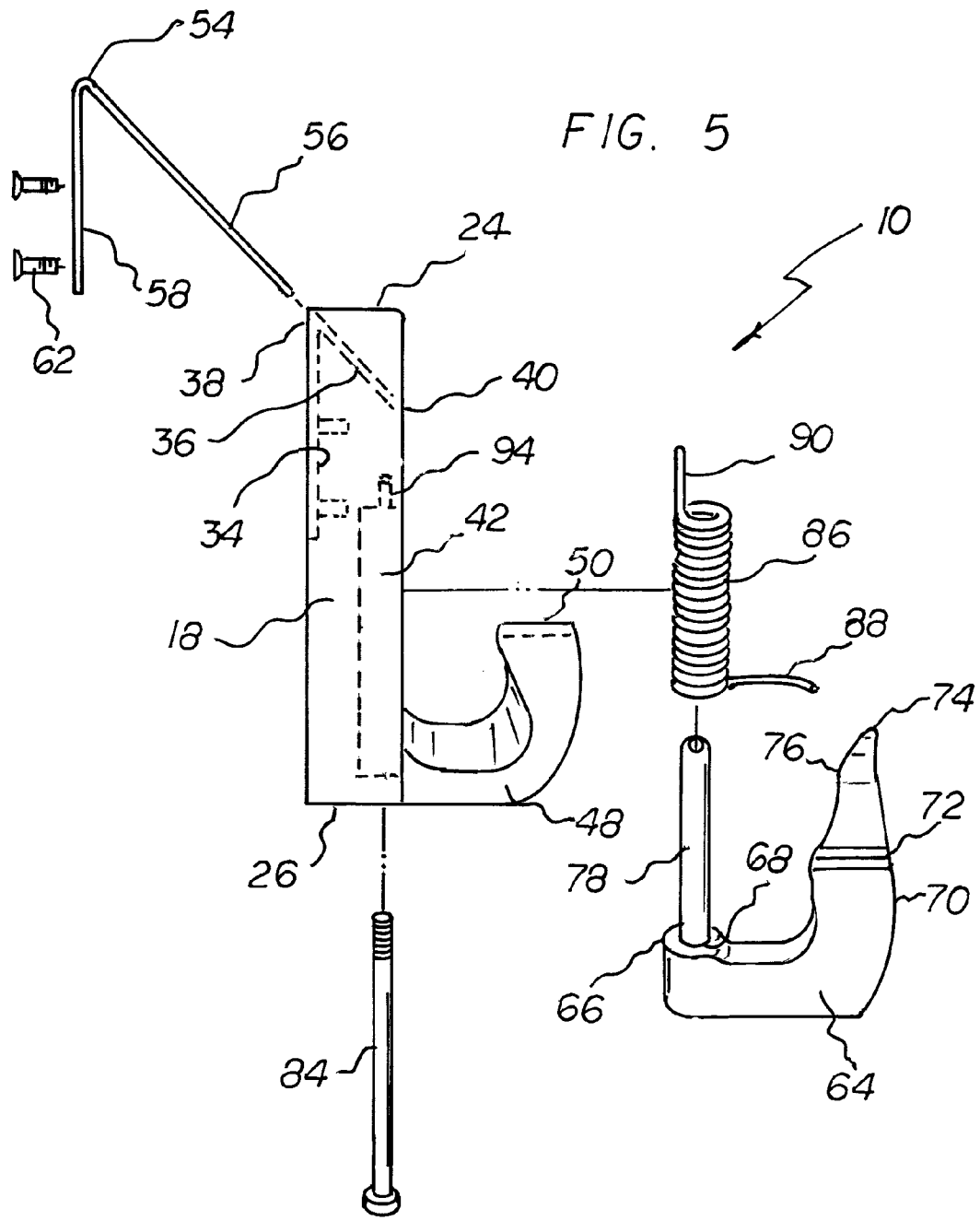
FIG. 5 is an exploded side view of the retaining device of the prior Figures.

With reference now to the drawings, and in particular to FIG. 1 thereof, the preferred embodiment of the new and improved retaining device embodying the principles and concepts of the present invention and generally designated by the reference numeral 10 will be described. All directions described herein, such as up, down, left, right, front, and rear, are relative to the description of the illustrations that follow, and not necessarily indicative of the orientation of the final orientation of the device in use.

The present invention, the retaining device 10 is comprised of a plurality of components. Such components in their broadest context include a ring having a gate that opens to permit entry of an object into its aperture, a gate that opens to permit exit of an object from the aperture on a different axis, and biasing mechanism for the gate(s).

The two gates can be a single gate that opens on two separate axes. For the sake of this explanation, it will be first shown as two gates. Such components are individually configures and correlated with respect to each other so as to attain the desired objective.

The retaining device 10 of the present invention is for receiving an indefinite number of kinds of objects 14 through moving contact between the objects and the retaining device on one axis of direction and dispensing the object through moving contact between the object and the device on another axis of direction. The receiving, the dispensing, and the moving contact on two distinct axes are done in a safe, convenient, and economical manner.

In the preferred embodiment of the retaining device 10 of the present invention, first provided is a ring 12. The ring is comprised of a lower perimeter which is a hook 48, a frontal perimeter which is an exit gate 70, an upper perimeter which is an entry gate comprised of a leaf spring 54, and a rear perimeter which is a mounting plate 18.

The mounting plate is formed of a rigid material in a planar configuration. The mounting plate has a forward surface 20 and a rearward surface 22. The mounting plate has an upper edge 24 and a parallel lower edge 26. The mounting plate has a left side edge 28 and right side edge 30. The mounting plate has circular apertures 32 for fasteners. The fasteners affix the device to an anchor which exceeds by inertia the biasing force of the coil spring 86. The mounting plate has a recess 34 in the rearward surface adjacent to the upper edge closer to the left side edge than to the right side edge. A slot 36 is provided. The slot has an input end 38 and an output end 40. The input end is in and at the top of the rearward recess. The output end is in the forward surface below the input end. The mounting plate has a rectilinear chamber 42 in the forward surface closer to the lower edge than the upper edge. The rectilinear chamber is tilted at an angle approximately 30 degrees off of vertical, toward the left side edge from the bottom.

Next provided is a hook 48. The hook constitutes the lower perimeter of the ring. The hook is fixedly secured to the forward surface of the mounting plate. The hook extends forwardly from adjacent to the lower edge. The hook has an upwardly extending tip 50.

A leaf spring 54 is next provided. The leaf spring constitutes the upper perimeter of the ring. The leaf spring also comprises an entry gate for objects to be retained. The leaf spring has an angled section 56 and a vertical section 58. The angled section extends downwardly through the slot and terminates with an angled end 60 adjacent to the tip. The vertical section is positioned in the rearward recess. Fasteners 62 secure the vertical section in the rearward recess.

Next provided is an exit gate 64. The exit gate comprises the frontal perimeter of the ring. The exit gate is formed in a J-shaped configuration. The exit gate has a short section 66 with a cylindrical aperture 68. The exit gate has a tall section 70 with a notch 72 at an intermediate location. The notch saddles the tip of the hook. The tall section has an upper end 74 adjacent to the angled end of the leaf spring. The tall section extends upwardly and is formed with a contoured face 76 facing rearward. A hollow tube 78 is next provided. In an alternate embodiment, the device will not incorporate this hollow tube, but will instead utilize an elongated bolt 84 of a larger diameter. The hollow tube has a lower end secured in the cylindrical aperture and extending upwardly.

Lastly in the preferred embodiment, a coupling assembly 82 is provided between the exit gate and the mounting plate. The coupling assembly includes an elongated bolt 84 extending through the hollow tube and anchoring into the interior of the mounting plate at region 94. The coupling assembly also includes a coil spring 86 encompassing the hollow tube. The coupling assembly and hollow tube fit into the rectilinear recess of the mounting plate.

The coil spring has a lower arm 88 in contact with the lower right side of the exit gate. The coil spring has an upper arm 90 positioned in a recessed area 92 in the front surface of the mounting plate to secure the spring during use. The coil spring biases the exit gate against the hook and the tip of the leaf spring.

An object 14 is next provided. The object is not a part of the invention. It is depicted here to show the manner and method of use of the invention. The object is indicative of an indefinite number of kinds of objects that may be retained by the device, in any number of embodiments.

When the object is received by the retaining device, it moves downward 96. It contacts and overwhelms the bias of the leaf spring. The leaf spring yields downward, opening the ring.

The downward force of the object, for example but not limited to, its weight, holds the object on the lower perimeter of the ring, namely, on the hook and on the lower section of the exit gate. The diagonal arrangement of the exit gate allows the force of the retained object to assist in holding the exit gate closed, as the downward direction of force is somewhat opposed to the opening direction of the exit gate.

When the object 14 is dispensed by the retaining device, it slides upward along the hook and the contoured edge 76 of the exit gate, applying a force by contact to the exit gate. The force overwhelms the bias of the coil spring. The coil spring yields, allowing the exit gate to open away from the hook and the leaf spring. The exit gate rotates open in a rightward and upward direction, pivoting on an axis determined by the orientation of the coupling assembly. The object is dispensed in a direction 98 roughly perpendicular to the axis of rotation of the exit gate. After the object is dispensed, the coil spring urges the exit gate back to its closed position.

As to the method of use and manner of operation of the present invention, the same should be apparent from the above description. Accordingly, no further discussion relating to the method of use and operation will be provided.

With respect to the above description then, it is to be realized that the optimum dimensional relationships for the parts of the invention, to include variations in size, materials, shape, form, function, and method of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A retaining device comprising:
   a ring including constructions comprising a hook, a lateral gate in a J-shaped configuration, a coil spring, and a longitudinal gate, the lateral gate being laterally shiftable with respect to the hook, the coil spring coupling the lateral gate and the hook for applying a rotational force to the lateral gate, the longitudinal gate secured to the hook and in separable contact with the lateral gate;
   the ring providing a first utility of receiving one of a plurality of objects, the first utility being activated by a force of contact by the object against the retaining device in a first defined axis of motion; and
   the ring providing a second utility of releasing a retained one of the plurality of objects, the second utility being activated by a force of contact by the, one of the plurality of objects against the retaining device in a second defined axis of motion.

2. The retaining device as set forth in claim 1:
   wherein a closed position of the lateral gate and the longitudinal gate facilitates retaining the one of the plurality of objects within the ring and an open position of the lateral gate facilitates exit of the one of the plurality of objects from the ring.

3. The device as set forth in claim wherein the longitudinal gate is a leaf spring.

4. The device as set forth in claim 1 wherein the retaining device incorporates a mechanism for the purpose of mounting it to another object and whereby the another object to which the retaining device is mounted provides inertia that exceeds biasing that holds the ring closed.

5. A retaining device (10) for receiving and dispensing objects (14) through moving contact between the object and the retaining device, the retaining device comprising, in combination:
   a mounting plate (18) formed of a rigid material in a planar configuration, the mounting plate having a forward surface (20) and a rearward surface (22), the mounting plate having an upper edge (24) and a parallel lower edge (26), the mounting plate having a left side edge (28) and right side edge (30), the left side edge and the right side edge being wider spaced at the upper edge than at the lower edge, the mounting plate having two laterally spaced circular apertures (32) adjacent to the upper edge for attachment screws, the mounting plate having a rear recess (34) in the rearward surface adjacent to the upper edge closer to the left side edge than to the right side edge, a slot (36) having an input end (38) and an output end (40), the input end being in the rear recess, the output end being in the forward surface below the input end, the mounting plate having a rectilinear chamber (42) in the forward surface closer to the lower edge than the upper edge, the rectilinear chamber being at an angle of from 25 degrees to 35 degrees from vertical;
   a hook (48) being fixedly secured to the forward surface of the mounting plate, the hook extending forwardly from adjacent to the lower edge, the hook having an upwardly extending tip (50);
   a leaf spring (54) having an angled section (56) and a vertical section (58), the angled section extending downwardly through the slot and terminating with an angled end (60) adjacent to the upwardly extending tip, the vertical section being positioned in the rear recess, threaded fasteners (62) securing the vertical section to the rear recess;
   a lateral gate (64) formed in a J-shaped configuration, the lateral gate having a short section (66) with a cylindrical aperture (68), the lateral gate having a tall section (70) with a notch (72) at an intermediate location, the tall section having an upper end (74) located adjacent to the angled end of the leaf spring, the tall section extending upwardly and formed with a contoured face (76) facing rearward, a hollow tube (78) having a lower end secured in the cylindrical aperture and extending upwardly;
   a coupling assembly (82) between the lateral gate and the mounting plate, located in the rectilinear chamber of the mounting plate, the coupling assembly including an elongated bolt (84) extending through the hollow tube and anchoring into the interior of the mounting plate at region (94), the coupling assembly also including a coil spring (86) encompassing the hollow tube, the coil spring having a lower arm (88) in contact with a lower right side of the lateral gate, and an upper arm (90)

positioned in a recessed area (92) in the forward surface of the mounting plate to secure the coil spring during use, the coil spring biasing the lateral gate against the hook and the upwardly extending tip of the leaf spring; and an object (14) to be received and dispensed by the retaining device, the object when being received by the retaining device contacting and thereby moving the leaf spring to allow passage of the object downwardly, the object when being dispensed by the retaining device sliding along the contoured surface of the lateral gate and thereby oscillating the lateral gate away from the leaf spring to allow passage of the object upwardly.

\* \* \* \* \*